United States Patent [19]

Nied et al.

[11] Patent Number: 4,804,146

[45] Date of Patent: Feb. 14, 1989

[54] METHOD FOR THE CONTINUOUS PRODUCTION OF GRANULATES FROM A SOLID IN A FLUIDIZED BED OF MATERIAL

[75] Inventors: Roland Nied, Bonstetten; Herbert Hackl, Augsburg, both of Fed. Rep. of Germany

[73] Assignee: Alpine Aktiengesellschaft, Augsburg, Fed. Rep. of Germany

[21] Appl. No.: 936,198

[22] Filed: Dec. 1, 1986

[51] Int. Cl.$^4$ .................................... B01J 8/24
[52] U.S. Cl. .............................. 241/5; 241/24; 241/79.1; 427/213
[58] Field of Search ............. 241/79.1, 5, 39, 24, 241/19; 34/57 A; 427/213; 71/31, 39; 159/DIG. 3; 366/101, 107

[56] References Cited

U.S. PATENT DOCUMENTS

| 3,376,124 | 4/1968 | Hollingsworth | 71/39 |
| 3,880,968 | 4/1975 | Kaspar et al. | |
| 4,370,198 | 1/1983 | Dencs et al. | 159/DIG. 3 X |
| 4,602,743 | 7/1986 | Nied | 241/5 |

FOREIGN PATENT DOCUMENTS

| 2231445 | 1/1973 | Fed. Rep. of Germany. |
| 3043440 | 3/1984 | Fed. Rep. of Germany. |
| 2908136 | 5/1984 | Fed. Rep. of Germany. |
| 2266129 | 6/1978 | France. |
| 714122 | 2/1980 | U.S.S.R.. |
| 1026329 | 4/1966 | United Kingdom. |
| 2084044 | 4/1982 | United Kingdom. |

*Primary Examiner*—Mark Rosenbaum
*Attorney, Agent, or Firm*—Pennie & Edmonds

[57] ABSTRACT

The invention concerns a method for the continuous production of a solid granulate by drying and simultaneous granulation in a flow bed. In this connection, the solid to be granulated, in the form of a solution or suspension, is sprayed into or onto the bed of material consisting of pregranulated solid and fluidized by an injected drying gas of suitable temperature, a corresponding quantity of granulate is discharged from the bed of material and separately therefrom the drying gas is drawn off together with the water vapor produced. In order to obtain a mode of operation independent of the flow velocity of the drying gas, the granules of the fluidized bed of material are continuously subjected to a centrifugal force classification, the mixture of drying gas and water vapor serving as carrier gas for classification.

8 Claims, 1 Drawing Sheet

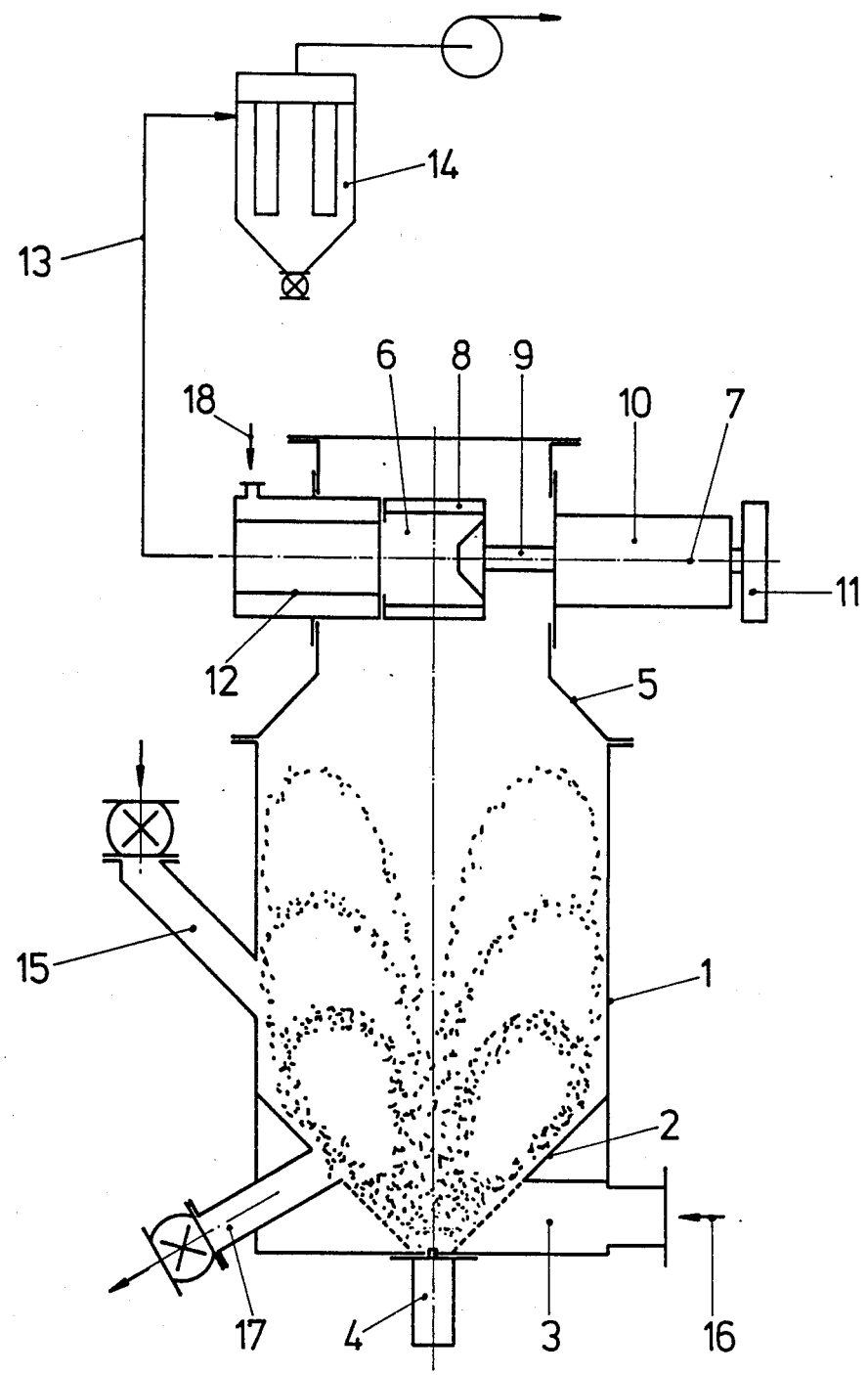

METHOD FOR THE CONTINUOUS PRODUCTION OF GRANULATES FROM A SOLID IN A FLUIDIZED BED OF MATERIAL

BACKGROUND

The invention relates to continuous production of granulates from a solid in a fluidized bed of material where the solid is sprayed into or onto the fluidized bed of pregranulated solid.

A known method has the solid to be granulated, in the form of a solution or suspension, sprayed into or onto the bed of material consisting of pregranulated solid. The bed is fluidized by an injected drying gas of suitable temperature and a corresponding quantity of finished granulates is discharged from the bed of material. The drying gas is drawn off separately from the finished granulates but together with the resultant water vapor. Various forms of equipment for accomplishing this method principle are described in, for example, Great Britain patent No. 1,026,329, U.S. Pat. No. 3,376,124, German patent No. 2,908,136 or German OS No. 3,043,440.

This known method furnishes satisfactory results so long as relatively large granules are produced. In that situation, high flow velocities of the drying gas may be used for fluidizing the bed of material so that the ratio of throughput and equipment size can be kept within technically reasonable limits.

However, in the production of microgranulates, which are increasingly demanded by industry, difficulties in using the known methods arise. In the case of microgranulates, a fluidization of the bed of material sets in even with very low flow velocities of the drying gas; therefore, with equipment of a given size only a fraction of the yield versus large granules can be obtained or considerably larger equipment must be used. Larger equipment, however, cannot produce a uniform flow bed because of bubble formation in narrowly limited regions which always occurs and causes the remaining flow bed to break down.

The method disclosed in German OS No. 2,231,445 seeks to overcome these difficulties by capturing the granulets discharged with a tubular filter. The drying gas and water vapor pass through the filter while the granulets are returned to the fluidized bed of material. In that method, however, the permissible range of flow velocity of the drying gas remains very narrow. With high flow velocities the smallest granules no longer fall back into the bed of material but rather adhere to the filter bags thus making continuous operation difficult.

SUMMARY OF THE INVENTION

It is an object of the invention, therefore, to improve the known method for the continuous production of solid granulate so that operation independent of the flow velocity of the drying gas is possible.

To accomplish this, the granulates discharged from the bed of material along with the drying gas and the water vapor are constantly subjected to a centrifugal force classification. The mixture of drying gas and water vapor are used as carrier gas for classification.

In this way the particle diameter of the discharged granules no longer depends upon the flow velocity of the drying gas, but only upon the parameters of classification. In addition, the granulates are subjected to an intensified internal circulation and reach the stream of the injected solution or suspension more frequently. Therefore, the growth of their particle size proceeds more rapidly than in an external circulation, for example, via a filter cyclone. The material-carrier gas concentration appearing may be very high. According to the inventor's experience, for example, even with a ratio of 3 kg material per $m^3$ carrier gas, operation without adverse effect on the classifying function is possible.

Alternatively, it is advantageous for the separating size of the centrifugal force classification to be made adjustable so that the particle diameter of the granules discharged by the drying gas may be fixed or the quantity of granulate discharged controlled independently of the quantity of drying gas. It is thus possible for the otherwise necessarily controlled introduction of nuclei to be eliminated in most cases, especially when the separating size of centrifugal force classification is set to a particle size that is smaller than the particle size of the nuclei required for granulate formation.

Any classifying means working according to the centrifugal force principle is suitable for performing classification. Especially advantageous, however, is the use of a classifying wheel rotating, for example, about a horizontal axis, with blades uniformly distributed on its periphery, through which the drying gas and the water vapor flow against its centrifugal action, from the outside in. Specifically, it has been shown that this classifying means, even with the high concentration of material of the method pursuant to the invention, works surprisingly stably, i.e., the separating size, once set, is maintained regardless of quantity and particle size distribution of the material supplied for classification.

BRIEF DESCRIPTION OF THE DRAWINGS

The FIGURE of the drawing is a schematic drawing of an apparatus using the method of the present invention.

DESCRIPTION OF THE PREFERRED EMBODIMENT

An apparatus for carrying out the method of the invention is shown in the FIGURE. The apparatus comprises a vertical-axis cylindrical receptacle 1 having a funnel-shaped bottom 2. The lower part of bottom 2 is made of a perforated plate which permits communication of the inner space of receptacle 1 with chamber 3. At the lowest point of bottom 2 is a spray nozzle 4 with an upwardly directed orifice.

At the top of receptacle 1 is a cap 5 which bears a classifying wheel 6. Classifying wheel 6 rotates about a horizontal axis 7. This classifying wheel 6 is of the type having a plurality of narrow blades 8 which run radially or obliquely to the periphery of classifying wheel 6. The classifying wheel 6 is carried on shaft 9 which in turn is carried in a bearing housing 10. Shaft 9 is driven via a belt pulley 11 by a motor (not shown). The space within the blades 8 of classifying wheel 6 opens into a double walled pipe 12. Pipeline 13 connects double walled pipe 12 to a tubular filter 14.

In operation, the receptacle 1, before being started, is filled by a feeding device 15 with pregranulated solid up to a predetermined level. Drying gas of a suitable temperature, which is introduced into the chamber 3 at 16, passes through the perforated part of the floor 2 into the receptacle 1, flows through the bed of material from the bottom upward and thereby fluidizes it. The degree of fluidization is determined essentially by the flow velocity of the gas.

Through the spray nozzle 4, designed as a dual substance nozzle, are introduced the solution or suspension of the solid to be granulated and, simultaneously, compressed air. Because both are introduced simultaneously, the liquid is divided up into tiny droplets. The high exit velocity of the compressed air from the spray nozzle causes a breakup of the fluidized mass, so that a strongly pronounced jet is produced, in which the sprayed moist granules are transported upward until they have reached their final ascent level, which level depends upon their size. After reversing direction at the vertex, the granules now fall in a direction against the upward flow of drying gas at the outer periphery of the receptacle 1. The granules ultimately flow back into the flow bed and by this time are already dried off. Because of the operating parameters appropriately given in advance, the granules are dry enough that they do not clump when they meet other granules. The drying gas, cooled down by the absorption of water vapor, and the expanded compressed air together flow through the blade ring of the rotating classifying wheel 6 from the outside in, while the centrifugal action of the classifying wheel prevents granules above a given particle size from likewise being discharged. This particle size, designated as separating size of the classifier, is accordingly dependent upon the quantity of carrier gas (here drying gas, water vapor and compressed air) and the speed of the classifying wheel, so that with a predetermined quantity of gas this particle size may be varied by varying the speed of the classifying wheel.

Through pipeline 13 carrier gas and very fine discharged particulate reach the tubular filter 14 (under certain circumstances a cyclone might alternatively be used here), where the particulate is separated from the carrier gas. Depending upon the application and/or nature of the very fine particulate, the latter may be discarded or returned to the receptacle 1 as seed particles. A part of the granulate stream falling back into the receptacle 1 is continuously drawn off through the discharge line 17 and separated on a sifting machine (not shown) into finished material (sieve oversize) and return material (sieve throughs) and the latter returned to the receptacle 1 by the feeding means 15 (if necessary together with the very fine particulate from the bag filter 14). At 18 compressed air is introduced into the outer chamber of the pipe 12. The compressed air enters the slot between pipe 12 and classifying wheel 6 through apertures in the front of the pipe 12; and owing to high flow velocity in radial direction inward and outward, prevents any penetration of material into the slot.

We claim:

1. A method of continuously producing granulates from a solid, comprising the steps of:

disposing a quantity of a pregranulated solid material in a vessel having a spray nozzle in its lower portion, and having a centrifugal separator disposed in a upper portion thereof, fluidizing the pregranulated solid material by injecting a drying gas into the vessel, and spraying a mixture of water and the solid to be granulated into the vessel through the spray nozzle, wherein the rate of injection of the drying gas and the rate of spraying are such that a first portion of the solid is dried and forms a relatively coarse seed for formation of a granulate, and is precipitated downwardly and further coated by said sprayed mixture thus forming a granulate, a second portion of the solid is dried, forming a relatively fine powder too fine to serve as a seed for the granulate, and is removed by said centrifugal separator, and a third portion of the solid, having been granulated, is removed from the vessel.

2. The method according to claim 1 wherein:

(a) the solids sprayed to the fluidized bed are in solution with water.

3. The method according to claim 1 wherein:

(a) the solids sprayed to the fluidized bed are in a suspension in water.

4. The method according to claim 1 wherein:

(a) the solids in a mixture with water are sprayed into the fluidized bed of material.

5. The method according to claim 1 wherein:

(a) the solids in a mixture with water are sprayed onto the fluidized bed of material.

6. The method according to claim 1 wherein:

(a) the separation boundary of the centrifugal force classification is adjustable independently of the quantity of carrier gas.

7. The method according to any one of the claims 2–6 or 1 wherein:

(a) a classifying wheel having a plurality of blades positioned about its periphery is rotated to provide classification by flow of the drying gas and water vapor from outside the wheel to inside the wheel.

8. The method of claim 7 wherein said wheel rotates about a horizontal axis.

* * * * *